Jan. 19, 1965  H. A. JEWETT  3,166,315
FLOATABLE DIVING ASSEMBLY
Filed Aug. 18, 1958  10 Sheets-Sheet 1

INVENTOR
Harold A. Jewett.

Jan. 19, 1965  H. A. JEWETT  3,166,315
FLOATABLE DIVING ASSEMBLY
Filed Aug. 18, 1958  10 Sheets-Sheet 3

INVENTOR
Harold A. Jewett.

Jan. 19, 1965    H. A. JEWETT    3,166,315
FLOATABLE DIVING ASSEMBLY
Filed Aug. 18, 1958    10 Sheets-Sheet 4

INVENTOR
*Harold A. Jewett.*

Jan. 19, 1965     H. A. JEWETT     3,166,315
FLOATABLE DIVING ASSEMBLY
Filed Aug. 18, 1958     10 Sheets-Sheet 5

INVENTOR
Harold A. Jewett.

Jan. 19, 1965  H. A. JEWETT  3,166,315
FLOATABLE DIVING ASSEMBLY
Filed Aug. 18, 1958  10 Sheets-Sheet 6

INVENTOR

Harold A. Jewett.

Jan. 19, 1965   H. A. JEWETT   3,166,315
FLOATABLE DIVING ASSEMBLY
Filed Aug. 18, 1958   10 Sheets-Sheet 7

INVENTOR.
Harold A. Jewett.

Jan. 19, 1965  H. A. JEWETT  3,166,315
FLOATABLE DIVING ASSEMBLY
Filed Aug. 18, 1958  10 Sheets-Sheet 8

INVENTOR.
Harold A. Jewett

Jan. 19, 1965 H. A. JEWETT 3,166,315
FLOATABLE DIVING ASSEMBLY
Filed Aug. 18, 1958 10 Sheets-Sheet 10

INVENTOR
Harold A. Jewett.

United States Patent Office 3,166,315
Patented Jan. 19, 1965

3,166,315
FLOATABLE DIVING ASSEMBLY
Harold A. Jewett, 5451 42nd St. NW.,
Washington 15, D.C.
Filed Aug. 18, 1958, Ser. No. 755,680
22 Claims. (Cl. 272—66)

This is a continuation-in-part of application Serial No. 469,599, filed November 18, 1954 and now Patent No. 3,083,965.

This application also contains subject matter disclosed to some extent in applicant's S.N. 307,099 filed Aug. 29, 1952 which (but not the subject matter of which) is now abandoned, and in applicant's Patents 2,675,728 and 2,675,729 (now Reissue 23,956) which are copending with said S.N. 307,099.

The central object of the invention is elimination or reduction to a negligible minimum of tipping of floating diving assemblies caused by down force of a diver springing from the front or take-off edge of a diving platform or board mounted on a floating base. Said object relates especially to assemblies in which minimization of down travel of the mounting of the platform or board is concomitantly desired, more especially to those where said take-off edge is elevated well above the water level or in addition projects frontwardly of deck structure to a point out over exposed water, and even more especially to those where the take-off edge is that of a springboard and/or the assembly is one which comprises deck structure suitable for accommodating a number of spectators.

In the case of diving assemblies mounted on huge craft, as e.g. at an in-built pool on an ocean liner, the problem is of course non-existent. But in the case of relatively small craft the problem not only exists but becomes increasingly acute as the size of the craft decreases.

Further or corollary objects of the invention include provision of:

Novel craft for use in the diving assemblies of the invention;

Still further objects will appear below, as the description proceeds.

Accomplishment of the aforesaid central object is effected, generally speaking, by placing the front edge of the take-off surface of the diving platform or board at a reentrant location in respect to the below defined preemptive periphery of the craft, as well as adjacent to or overlying the below defined diving area of a diving port also reentrantly thus located; the placement of said take-off edge progressively approaching the optimum as it is brought closer and closer to the below defined axis-of-uniform-sinkability (referred to hereinafter as the A-axis) of the craft.

It is axiomatic that when a craft is subjected to a downward jolt such as generated by a driver's jumping on or from a diving board the resultant sinking or increment of sinking involves pushing water out from under the craft. But the maximum amount of sinking occurs directly under the jolt (assuming it is at an extreme peripheral point), and the minimum amount at areas remote therefrom. This is a matter of common knowledge. Presumably it is due to an infinity of leverage forces transmitted by the superstructure of the craft (acting as a composite of an infinity of levers) to an infinity of infinitesimal columns of water contacting bottom surfaces of the craft. In other words, it seems as if the water at areas of less sinking acts as a fulcrum (or infinite number of fulcrums)—though a yielding one—about which the superstructure, acting as a lever (or infinite number of levers in one) turns, in overcoming the buoyancy of the water directly underlying the jolt.

The foregoing observations involve theory and therefore are offered only as potential aids to an understanding of the invention, and not with intent to be bound by possible inaccuracy in them.

It seems that every floating craft has an A-axis, and that said axis coincides with the point where the aforesaid infinity of leverage actions are in balance, so that the increment of sinking due to a downward jolt directly in the A-axis is uniform throughout the craft, i.e., causes "parallel sinkage" thereof. For an analytical and computational approach to the matter of achieving "parallel sinkage" in the case of an ordinary ship, reference is made to Vol. I of Principles of Naval Architecture 1949 (published by The Society of Naval Architects and Marine Engineers, N.Y., N.Y., and edited by H. E. Rossell and L. B. Chapman), particularly the passage on pages 150–151 which is sub-captioned: "1. Addition or Removal of Weight Without Change of Trim." An earlier discussion of the subject is to be found, as well, on pages 159–160 of the "Text Book of Theoretical Naval Architecture" by E. L. Attwood, 1916, published by Longmans, Green and Co., London and New York, etc.

In the most preferred embodiments of the invention the front edge (referred to below as the T-edge) of the take-off surface of the diving board or platform is placed so that it is tangent to (i.e. touches or intersects) the A-axis.

To determine the locus of said axis for any particular craft it is only necessary to apply a weight or down force at a more or less central portion of the superstructure and, if the craft tips in consequence, move the weight or force in a direction opposite to that of the tipping until the tipping disappears. Thus, if the craft is a small raft, the locus of its A-axis can readily be ascertained simply by stepping on the raft and, if its tips, stepping in a direction away from the tipping a sufficient distance for the tipping to disappear. The operation is as simple as, and not unlike that of a person's manipulation of the counterpoise along the steelyard of a set of platform scales when weighing an object, the underlying water being analogous to the scales, the person's weight on the craft analogous to the counterpoise, and the point of no tipping (i.e. the A-axis) analogous to the balance point reached along the steelyard.

For purposes of prescribing size limits to crafts within the contemplation of the invention it may be observed that for, say, a 400-pound down force or diving jolt to produce a relatively inconsequential minimum of say ⅛ inch uniform sinking will call for a total area of water-surface displacement measured in the plane of the water level, of about 640 square feet. This derives from the fact that a cubic foot of water will weigh (and therefore exert a buoyancy force of) only a few pounds over 60, wherefore a square foot of water ⅛ inch deep will weigh about 60/96 or ⅝ pound, and 640 square feet ⅛ inch deep about 400 pounds. Consequently, any craft whose total area of water-surface displacement measured in the plane of, i.e., which includes the water level, totals more than 640 square feet may be regarded as outside the size range of crafts contemplated by the invention.

Whenever expressions such as "total area of water displacement, measured in the horizontal plane of the water level," or "displacement area at the water level," appear below, they are intended to mean "total area of water-surface displacement, measured in the plane of the water level," and thus to designate the extent of water-surface which has been subtracted from the body of water in which the watercraft is floating, due to the presence of the watercraft therein.

As regards the other extreme, and excepting cases where maximizing rather than minimizing of sinking may be desired (e.g. to capitalize on the resilience provided by the water's buoyancy as in the case of the diving float of Burns U.S.P. 2,814,057), it may be observed that for, say, a 100-pound down force or diving jolt to produce a toleration maximum of say 2 inches uniform sinking will call for a total water displacement area, taken at the water level, of about 10 square feet. Consequently, when minimization of sinking as well as of tipping is desired, crafts whose water displacement area, taken at the water level, totals less than 10 square feet, may be regarded as outside the size range under contemplation.

Certain terms to be used in the ensuing description will have the following meanings:

*Craft.*—Any floating assembly within the aforesaid 640 square-foot limit which comprises rigid superstructure and sinks as a unit in response to a down force applied at a point on said superstructure, whether the latter merely rests on buoyant structure or is affixed thereto.

*Preemptive area of the craft.*—The overall area comprised within the shortest vertical film which can imaginarily be wrapped around the craft (inclusive of buoyant portions but exclusive of structure, if any, above the level of the take-off edge of the craft's diving platform or board).

*Preemptive periphery or boundary of the craft.*—Said film when thus imaginarily wrapped around the craft.

*Diving area of a subject port.*—The overall area comprised within the longest vertical film reaching 3 feet downward from the level of said take-off edge which can be imaginarily expanded (without overlap) within said port and then subtended across its mouth (if it has one), without intersecting craft structure. (For further particularization cf. the description of FIG. 69 below.)

The overall areas and periphery or boundary designated above are as they appear in plan view (i.e. as if on a map) and any dimensions given for or in relation to them herein mean as measured in overall on said plan view (or map).

Further particularizations in respect to said terms will appear below.

In the drawings (in respect to which all moving and bearing parts are to be understood as being optionally provided with rollers or the like, at bearing or rub points, also as being subject to modification to give them or enhance their individual replaceability: all lever, spring or other moving parts as provided, when needed, with suitable freedom of play and appropriate stop, anti-backlash, damper and shock and/or sound-absorbing means; all parts as having fitting anchorages, guards and/or housing; all figures as being basically diagrammatic or schematic; and all expressions such as anterior, posterior, frontward, rearward, horizontal, lateral, longitudinal, etc., as being relative and approximate unless otherwise evident), to be more particularly described later on.

Wherever the symbols A, B, M, P, T and $t$ appear in the drawings, their meanings will be as follows:

A—Axis of uniform sinkability as above explained;
B—Any point or points located a maximum distance from A in an area of water displacement, and measured in the horizontal plane of the water level;
M—Said distance from A to B;
P—A diving port in a craft of the invention;
T—The take-off surface of any diving board or platform used in the invention, said surface being regarded as about a foot in front-to-rear dimension and as having an above-the-water-level take-off edge (referred to below as a T-edge) at its front;
$t$—Any point in said T-edge.

Particular reference to these symbols will be made in the description of FIGS. 66–69 below.

Certain symbols appearing on figures of said 3,083,965 and also on figures hereinbelow will have the same meanings herein as in said 3,083,965. Said symbols and meanings follow:

E—A pre-fulcrum rigid elbow, visible in side elevation views of any of the lever-type diving boards of the invention, or the first such elbow where there are a series;
E$r$ and E$l$—Right and left counterparts, respectively, of such elbow where it is bifurcate;
$f$—The fulcrum of a lever-type diving board;
$fr$ and $fl$—Right and left counterparts, respectively, of said fulcrum, where either it or the portion of the board contacting it is bifurcate.

In FIGS. 1–5 horseshoe-like superstructure 1 is supported by oblong-shaped, equal-sized float members 2. Conventional lever-of-the-first-kind diving board 3, mounted on said superstructure via anchor pivot 4 and fulcrum 5 points toward and partially overlies diving port P. Fixed posts 6 and 7 rising through apertures 8 and 9 in the superstructure represent optional mooring expedients for limiting skidding movement of the assembly during use. C represents the imaginary vertical line which includes the center of symmetry of the four frontward float members taken as a unit, while D represents the corresponding line in the case of the two rear float members taken as a unit. A is tangent to the T-edge.

In connection with the fact that the displacement area at the water level for said four frontward float members is twice that for said two rear float members, it will be noted that the ratio of the C-to-A distance to the D-to-A distance is 1 to 2.

In FIGS. 1–5, as filed, the scale was about 3/16" to 1'. Thus the craft of said figures may be viewed as being about 15 feet square, the board about 10 feet long and the port about 5 feet wide and 6 feet in re-entrant or front-to-rear dimension.

Since no particular weight is specified for superstructure 1 or diving board 3, anchor pivot 4 or fulcrum 5, they are schematically shown as if the deck were perfectly horizontal. In actual practice, however, the weight of said parts could cause more or less tilt, due to (1) the absence of structure above the water in the diving port; (2) the rearwardness of the diving board, etc.; and (3) the disproportionate share of the overall load consequently borne by the two rear float members, as compared with the four front ones. The degree of tilt could of course be minimized by use of low-weight materials for said parts.

Figure 1:
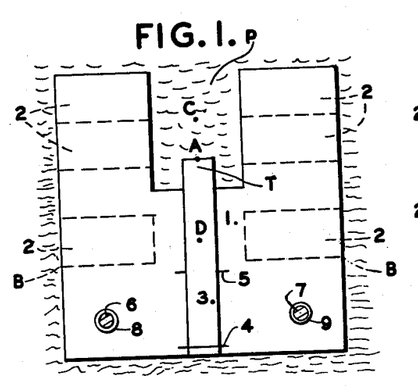
FIG. 1 is a plan view of an assembly according to the invention wherein a craft having a diving port is combined with, and serves as a mounting for, a conventional form of lever-type diving board; said assembly representing a presently preferred embodiment of the invention for use in situations where front-to-rear space is plentiful.
Figure 2:
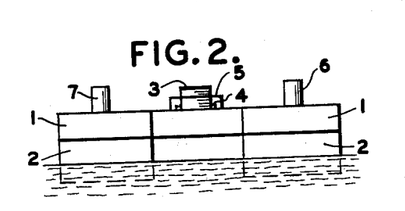
FIG. 2 is a front elevation of the assembly of FIG. 1.
Figure 3:
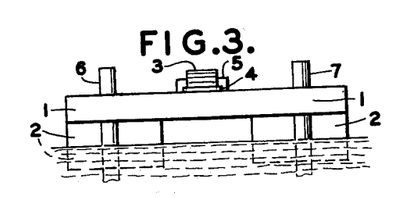
FIG. 3 is a rear elevation of the assembly of FIG. 1.
Figure 4:
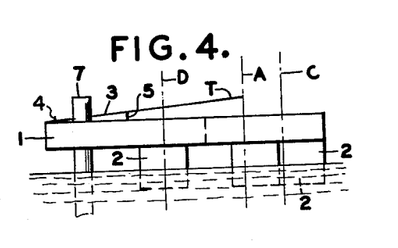
FIG. 4 is a side elevation of the assembly of FIG. 1.
Figure 5:
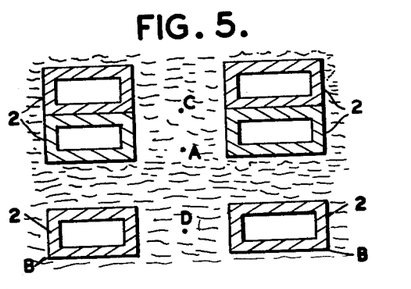
FIG. 5 is a horizontal section of the float members of the assembly of FIG. 1, taken at the water level.
Figure 6:
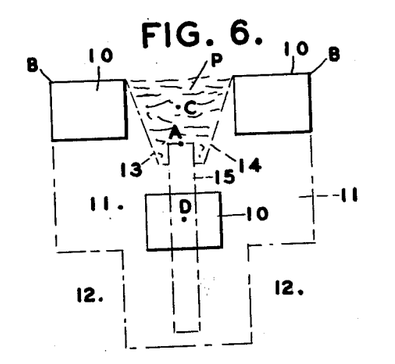
FIG. 6 is a plan view of an assembly generally similar to that of FIGS. 1–5 but differing in number, size and placement of float members as well as in area and contour of superstructure and port.

In FIG. 6 the buoyancy of the craft is much less than in FIGS. 1–5, due to the use of three equal-sized, oblong-shaped float members 10 (shown in solid lines) rather than the six float members of FIGS. 1–5. By way of compensation, the rear corner portions of the superstructure 11 (shown in long and short dash lines) are cut away as at 12. The boundaries 13 and 14 of the port P are shown as optionally convergent, but the length of the board 15 remains the same as the length of board 3 in FIGS. 1–4, and its placement in relation to A (as well as C and D) remains the same as in FIGS. 1–4.

Figure 7:
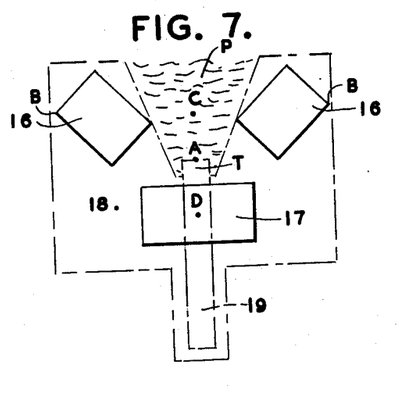
FIG. 7 is a plan view of an assembly generally similar to those of FIGS. 1–5 and 6, but differing in number, placement and comparative sizes of float members as well as in contour of superstructure and port.

In FIG. 7 front float members 16 are placed at an angle and are respectively smaller in size than rear float member 17. This, plus the contour of superstructure 18 depicted by long and short dash lines, represents a further optional variation from the assembly of FIGS. 1–5. In connection with the fact that the displacement area at the water level for the two front float members 16 (considered as a unit) is 7/4 that of rear float member 17, it will be noted that the ratio of the C-to-A distance to the D-to-A distance is 3 to 4. As in the case of FIG. 6 however, the length of the board 19 is shown as identical with the length of the board 3 of FIGS. 1–4, while the size of P is greater than in FIG. 6 and the width of its mouth is greater than in either FIG. 6 or FIGS. 1–5.

Figure 8:
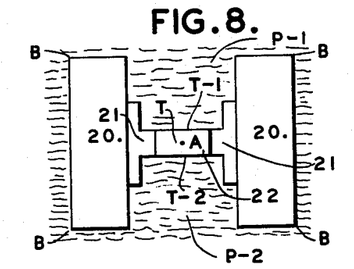
FIG. 8 is a plan view of a craft of the invention which comprises an elevated non-resilient diving platform having a take-off edge located in accordance with the invention.
Figure 9:
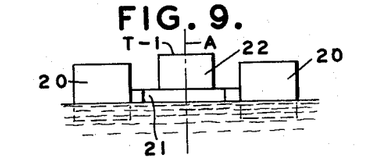
FIG. 9 is a front elevation of the craft of FIG. 8.
Figure 10:
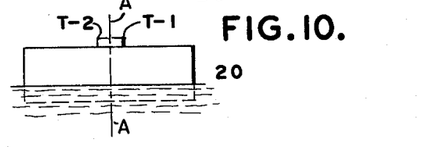
FIG. 10 is a side elevation of the craft of FIGS. 8–9.

In FIGS. 8–10 a pair of equal-size, oblong-shaped float members 20 are rigidly interconnected by frame structure 21 which comprises elevated diving platform 22 whose edges T–1 and T–2 respectively face diving ports P–1 and P–2. In view of the symmetry of water level displacement area, it will be noted that A passes through the mid-point of the platform 22, and each of the T–1 and T–2 edges is located closely nearby.

Figure 11:
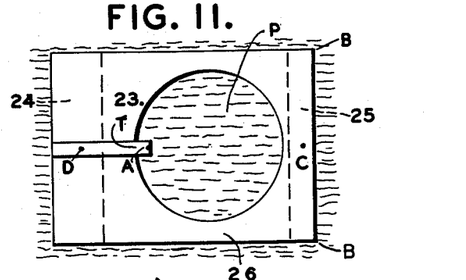
FIG. 11 is a plan view of an assembly of the invention wherein the port is wholly encompassed by craft structure and wherein the diving board is of the conventional type shown in FIGS. 1–4.

In FIG. 11 superstructure 23, wholly encompassing P, is supported by float members 24 and 25 which are identical in length and size except that 24 has twice the front-to-rear dimension of 25. A is located 1/3 the distance from D (the center of buoyancy of float member 24 per se) to C (the center of buoyancy of float member 25 per se). Generally P will be bottomless, so that its water level will be that of the main body of water in which craft 26 may be floating.

Figure 12:
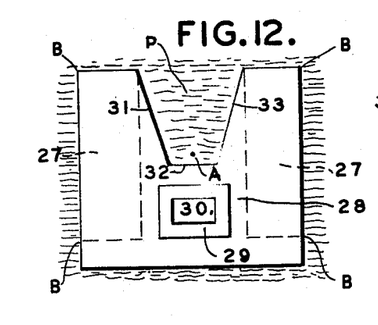
FIG. 12 is a plan view of an embodiment of the craft of the invention which is presently preferred as a mounting for any of the novel diving boards of the invention that are specially adapted for use where front-to-rear space is at a premium.
Figure 13:
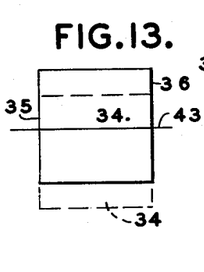
FIG. 13 is an end elevation diagram of an oblong-shaped float useful in the crafts of the invention, wherein solid-line outline depicts the at-rest position of the float as if prior to a diver's presence on the board, while dash-line outline depicts (to exaggerated extent) the down position of such float resulting e.g. from a diver's preliminary jump on the board, the path of such force being assumed to coincide with the A-axis of a craft in which the float is comprised.
Figures 14, 16:
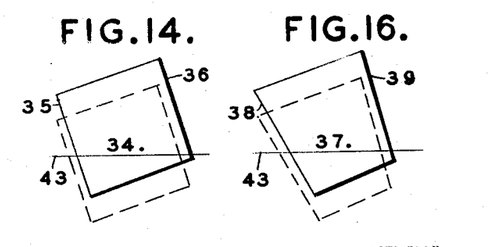
FIG. 14 is similar to FIG. 13 except that the float is initially in an exaggeratedly tilted position, e.g. such as might be due to unevenness in loading of the craft.
FIG. 16 is similar to FIG. 14 except for said divergence.
Figure 15:
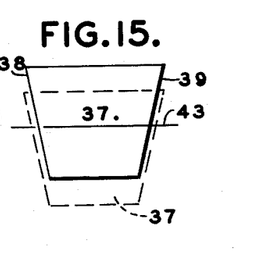
FIG. 15 is similar to FIG. 13 except for upward divergence of the sides of the float.
Figure 17:
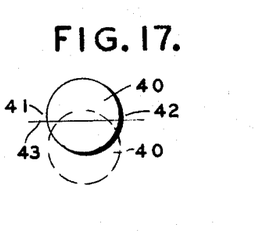
FIG. 17 is similar to FIG. 13 except that the float is cylindrical in shape.

In FIG. 12 a pair of float members 27 similar in size and shape to float members 20 of FIGS. 8–10 support superstructure 28. The latter comprises box-shaped well 29 having aperture 30. Rearward boundary portions 31, 32 and 33 of P (being elevated above the water level) optionally may be used as T-edges for diving in the practice of the invention (this, in view of their proximity to A). But the craft of FIG. 12 is especially adapted for use as a base for novel diving board installations such as described below.

In FIGS. 13–17 float 34 (FIGS. 13–14) has vertically parallel sides 35 and 36, thus being similar to the float members of FIGS. 1–12, while float 37 (FIGS. 15–16) has upwardly divergent sides 38 and 39 and float 40 (FIG. 17) has arcuate sides 41 and 42, the latter being similar to those of the empty-oil-drum type of floats that are commonly used as the buoyant members of conventional rafts. The water level in each of said figures is represented by line 43.

The extent of sinking, indicated by the dashline position of the floats, is the same in each figure. Comparison of the amount of submergence, i.e. water displacement, in the down positions of the floats with that in their up or initial positions will show that the variations in the mutual parallelism, divergence or convergence of the sides are not of great significance; also, that the initial tiltedness is not, either. In other words, the amount of water that has to be pushed out from under the float in the sinking process is not greatly affected by said variations. Nor does the displacement area at the water level vary to a great extent, as between the respective up positions and down positions of the floats.

These observations bear on the use of total-displacement-area-at-the-water-level as the basis of the above-discussed 640 square-foot upper limit (unqualified) and 10 square-foot lower limit (qualified) in regard to sizes of crafts within the contemplation of the invention; also on the fact that the A-axis of a particular craft derives its location not from the center of gravity of the craft, per se, but from the sizes and relative locations of the areas of water displaced by its float member or members, and as such is a substantially constant factor and one not subject to pronounced variations resulting from excessive or lop-sided loading of the craft—variations such as effect a very decided shift in the location of the center of gravity or axis of flotation of the craft, as contrasted with its A-axis.

Figures 18, 19, 20, 21, 22, 23, 24, 25:
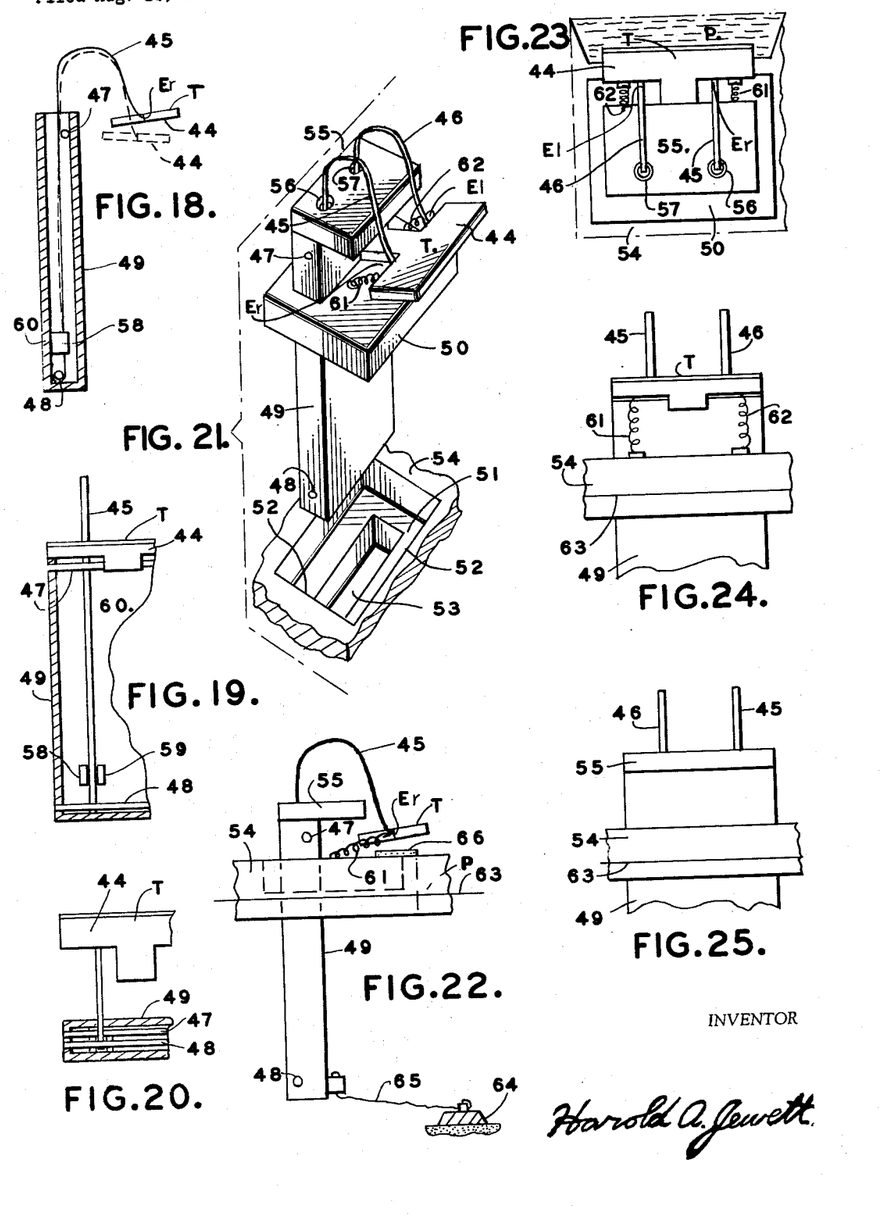
FIG. 18 is a fragmentary, partly sectional side elevation detail of one of the novel diving board units of the invention.
FIG. 19 is similar to FIG. 18 except in front elevation.
FIG. 20 is similar to FIGS. 18–19 except in plan view.
FIG. 21 is an exploded view of the structure of FIGS. 18–20 with certain parts added, and in position to be fed downwardly into place on a novel base of the invention.
FIG. 22 is similar to FIG. 21 except in side elevation, and showing the situation after said feeding into place.
FIG. 23 is similar to FIG. 22 except in plan view.
FIG. 24 is similar to FIGS. 22–23 except in front elevation.
FIG. 25 is similar to FIGS. 22–24 except in rear elevation.

In FIGS. 18–25 board 44 is in rigid angular union with leaf spring pieces 45 and 46 at, respectively, Er and El (FIGS. 21, 23). Said spring pieces are convoluted upwardly from E (FIGS. 18, 22), then downwardly into contact with fulcrums provided by fulcrum rod 47, and finally hookingly underlie anchor pivot rod 48 while seating on the bottom of equalizer box 49. Both of said rods are supported in horizontal position by the side walls of said box 49, the interior of which provides space for flexing of the vertical portions of the spring pieces 45, 46 between said rods. The down position of board 44 and said spring pieces under the weight of a diver is depicted by the dash lines in FIG. 18.

Collar 50 seats on bottom 51 of well 52 after feeding of box 49 through aperture 53 in the base 54. Roof 55 constitutes not only a closure for box 49 but also an approach to the board 44. Flare-mouthed openings 56 and 57 in said roof serve as guards to insure against injury incident to movement of the spring pieces during use. Spacers such as 58, 59, jutting from the front face of rear wall 60 of box 49, serve, together with said apertures, to prevent side-wise movement of the spring pieces during use.

Coils 61, 62 are schematic for any desired form of snubber springs or other shock absorbers, for minimizing whipping of the board during use.

As shown by water line 63 in FIG. 22, most of box 49 is apt to be submerged during use. Advantageously anchor 64 can be connected to box 49 by cable 65. In such case any rearward skidding tendency caused by the force of a diver's take-off can be limited by such anchorage, as well as by the keel effect of the rearward face of wall 60 resisted by the wall of water with which it is in contact. If desired, the lower portion of box 49 can be weighted to augment its inherent ballast effect. Cushion structure 66 (FIG. 22) constitutes a stop for preventing excessive down travel of the board during use.

As best seen in FIG. 23, the T-edge of take-off surface T overlies the water in port P and will advantageously be in close proximity to the A-axis of the assembly when base 54 is a floating craft.

Figures 26, 27, 31:
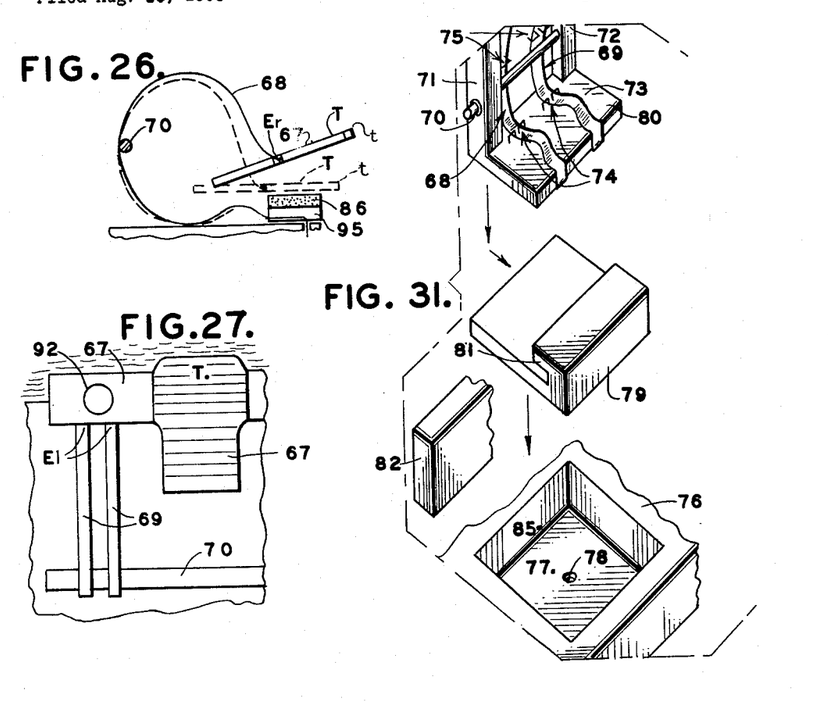
FIG. 26 is a fragmentary side elevation detail of a further diving board unit of the invention.
FIG. 27 is similar to FIG. 26 except in plan view and with certain structure added.
FIG. 31 is an exploded fragmentary perspective of the diving board unit of FIGS. 26–28 with certain parts added and slightly varied contour of spring pieces, the unit being in position to be fed from above into position on a base of the invention.
Figure 28:
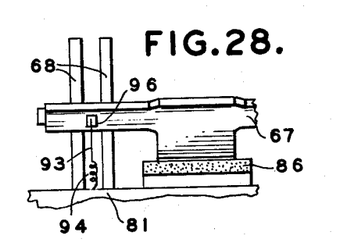
FIG. 28 is similar to FIGS. 26–27 except in front elevation.
Figure 29:
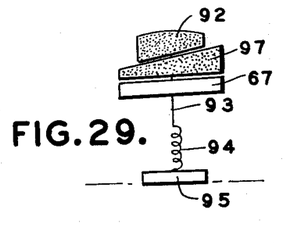
FIG. 29 is a side elevation detail of a form of shock absorber useful in the unit of FIGS. 26–28, combined with shim means for providing adjustability of spring force to the diving board.

In FIGS. 26–36 board 67 is in rigid angular union with right-side leaf spring pieces 68 and left-side leaf spring pieces 69 respectively, at Er and El, said spring pieces being convoluted upwardly from Er and El and then downwardly into contact with fulcrums provided by fulcrum rod 70 (shown with optionally increased thickness in FIG. 27), the latter, as best seen in FIG. 31, being supported in upright side structures 71 and 72 of springs block 73. Staple-like structures 74 and 75, jutting from said block 73, are schematic for any desired form of spacers to preclude side-wise displacement of the spring pieces during use.

Figure 32:
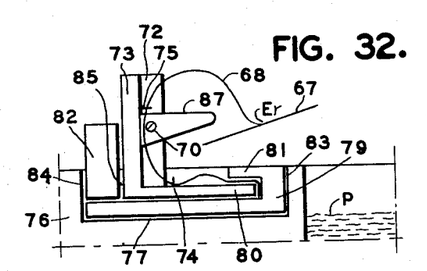
FIG. 32 is similar to FIG. 31 except in side elevation and showing the situation after said feeding into position; also except for omission of right-side wall structure of said base.

Base 76 comprises rectangular well 77 having an aperture 78 (FIG. 31) for drainage or circulation of water, and is adapted to receive lock block 79 which, after being lowered into well 77, is pushed frontwardly into the position shown in FIG. 32, whereupon springs block 73 is lowered onto said lock block 79 and likewise pushed frontwardly, into the position shown in FIG. 32. Its frontward portion 80 then underlies and is locked in place by top portion 81 of lock block 79. Next, filler block 82 is lowered into position, again as shown in FIG. 32. In consequence of this arrangement, downward and upward stresses generated in the use of board 67 are largely converted into horizontal forces which in turn are dissipated against 83 and 84 of well 77 via contact between blocks 73 and 82 as at 85.

Cushion 86 overlying said top portion 81 of block 79, serves to limit excessive down movement of board 67.

Figure 36:
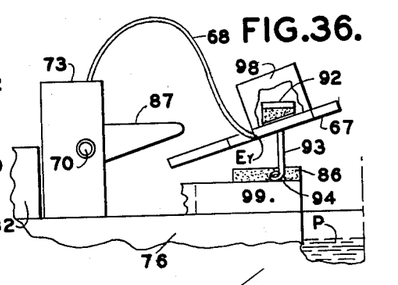
FIG. 36 is similar to FIGS. 33–35 except in side elevation.

Stepping ledge 87, projecting from block 73, is apertured as indicated in FIGS. 32 and 36 to permit fulcrum rod 70 to pass through it.

Figure 33:
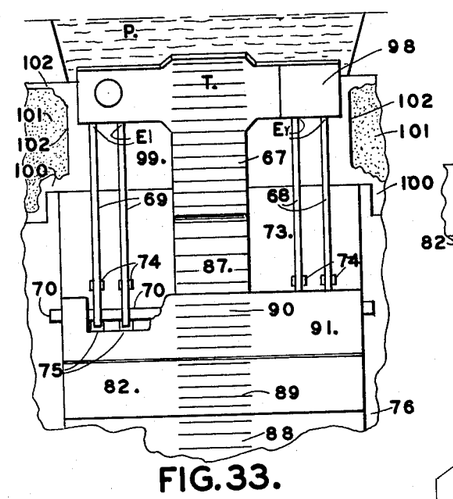
FIG. 33 is similar to FIG. 32 except in plan view and with certain roof and guard structure added.

As best seen in FIG. 33, the approach to the board is from tread portion 88 of base 76 to tread portion 89 of filler block 82, thence to tread portion 90 of roof 91 (shown only in FIG. 33) over springs block 73, next to stepping ledge 87, and finally to board 67.

Shock absorber means are exemplified by caps 92 at the upper ends of shanks 93 which are integral with distensible coil springs 94, the latter being secured to top portion 81 of lock block 79, which portion corresponds to cross piece 95 shown in FIG. 26 as bearing down on the frontmost portions of the spring pieces. Apertures 96 in the board 67 permit it to reciprocate during use without contacting shanks 93, while its up travel is limited by said caps 92.

Figure 30:
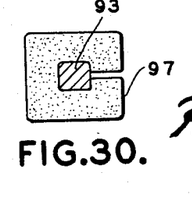
FIG. 30 is similar to FIG. 29 except in plan view and showing the shank of the shock absorber greatly enlarged and in section.

Variable continuing tension can be applied to the spring pieces by interposing shims such as 97 (FIGS. 29, 30) between the caps 92 and the board 67, the resulting tension varying with the thickness of the particular shim, and displacement of the shim during use being precluded by its split-ring type of grip-fit around the shank, as depicted in FIG. 30.

Optional housings such as 98 (FIGS. 33–36) can be made integral with the board 67 so as to ride up and down with it.

Figure 34:
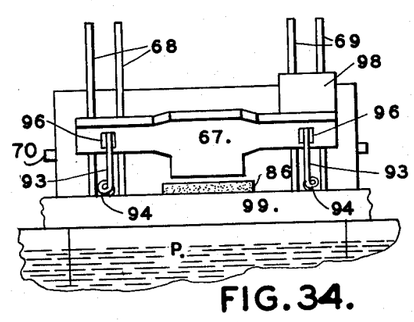
FIG. 34 is similar to FIG. 33 except in front elevation.
Figure 35:
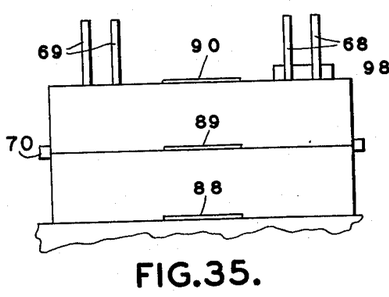
FIG. 35 is similar to FIGS. 33–34 except in rear elevation.

A weight box 99 optionally can be provided to rest on and across frontward portions of base 76 and top portion 81 of lock block 79, as schematically shown in FIGS. 33, 34 and 36 (vertical recessing to accommodate coil springs 94 being understood), with laterally and rearwardly extending portions 100 adapted to be filled with sand 101 or other heavy material. When sand is used, said portions can be open at the top, as depicted by the areas contiguous to the straight edges 102 in FIG. 33, so as to serve as sand boxes or play pits for children. This adaptation is particularly intended for large installations, as e.g. on docks of considerable magnitude, whether floating or land-based; and if the weight box be integrated to the springs block, no well will be necessary, mere setting of the assembly down on any flat area of the dock being sufficient, if followed by addition of an adequate weight of sand or the like.

Referring particularly to FIG. 26, it will be noted that the up movement of the front of the board involves a substantial forward component of direction. This supplements the forward component of spring force exerted by a diver, and results both from the elevated placement of the fulcrum rod 70 and the bending of the spring pieces.

Figure 37:
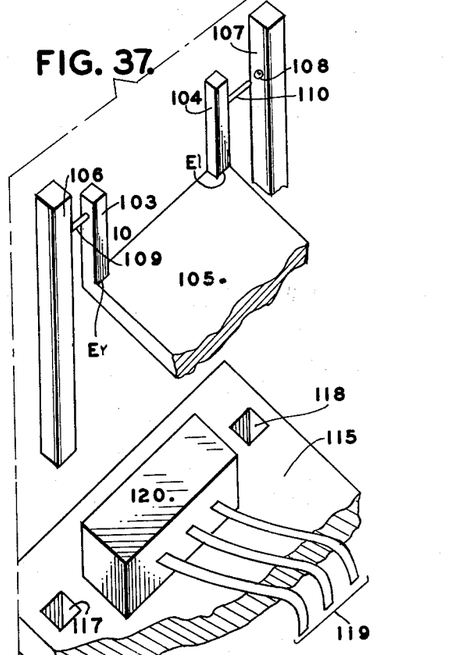
FIG. 37 is an exploded fragmentary perspective of a mounting for a gang of leaf springs and a pair of standards, together with the rear portion of a diving board of the invention adapted, after assembling of the parts, to be swingably fulcrumed in said standards and resiliently sustained by said springs.
Figure 38:
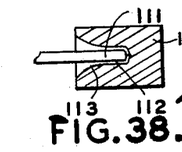
FIG. 38 is a sectional detail of a bearing surface comprised in a flare-mouthed opening in a block, said bearing surface exemplifying a form of guarded fulcrum suitable for receiving a rotatable spindle such as those appearing in FIG. 37.
Figure 39:
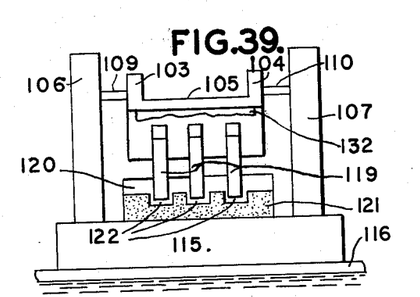
FIG. 39 is a front elevation of a diving board assembly comprising the parts shown in FIG. 37, after their assembly into position of use and with certain added parts.
Figure 40:
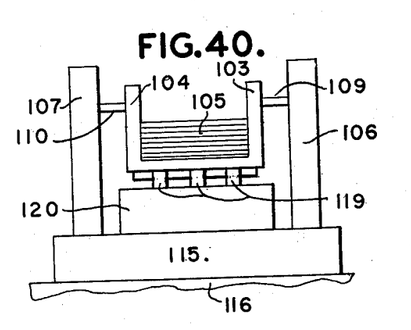
FIG. 40 is similar to FIG. 39 except in rear elevation.

In FIGS. 37–45 shank portions 103 and 104 of non-bending lever-type diving board 105 are in rigid angular union with it at elbows Er and El. Standards 106 and 107, each containing a flare-mouthed opening such as 108 in FIG. 37, provide fulcrums for spindles 109 and 110 which are respectively integral with said shanks 103 and 104, following feeding of said openings onto said pins and thereby inter-associating the parts in accordance with FIG. 38, where illustrative spindle 111 is fulcrumed on bearing surface 112 inside opening 113 in block 114. The standards and board, after being thus inter-associated, are lowered into place onto base block 115 mounted on craft 116, with the standards respectively seating in openings 117 and 118 and the under side of the board resting freely on leaf springs 119 which are secured in upward projection 120 of base block 115.

Advantageously board 105 can be made sufficiently heavy so that, being unattached to the springs 119, it will serve to dampen their vibration via its weight alone, without need for additional shock absorber means.

Surfacing of the board-contacting portions of the springs with anti-friction material, e.g. "Teflon" or analogous polymeric composition, or affixation of a replaceable facing or insert of such material to the springs-contacting area of the board, are advantageous expedients.

Excessive down movement of the board is precluded by cushion structure 121, the springs being respectively receivable in recesses 122.

Figure 43:
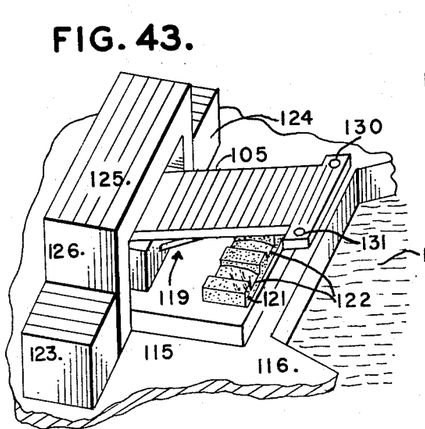
FIG. 43 is similar to FIGS. 39–42 except in perspective and with stepping blocks and housing structure added.

Approach to the board may be via portable stepping blocks 123 and 124 to the top 125 of portable housing 126, thence to the board 105.

Figures 41, 44:
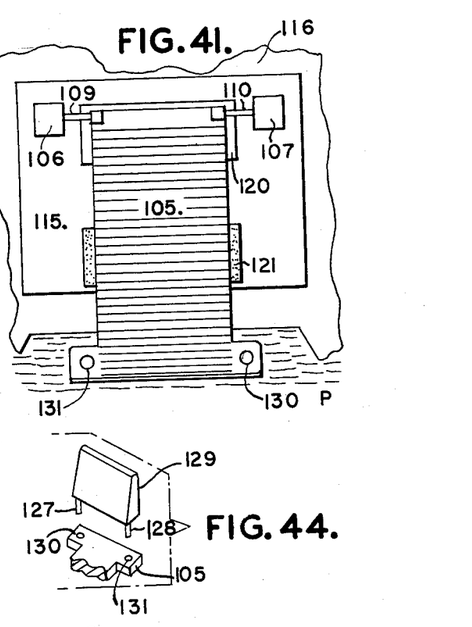
FIG. 41 is similar to FIGS. 39–40 except in plan view.
FIG. 44 is an exploded perspective detail of a portable back rest in position to be installed on the diving board of FIGS. 41–43, to equip said board for use as a spring chair.
Figure 42:
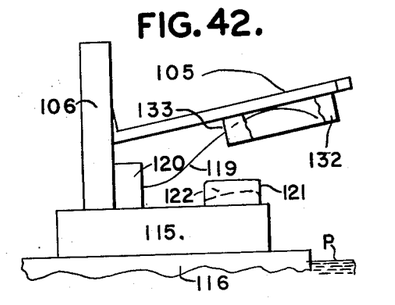
FIG. 42 is similar to FIGS. 39–41 except in side elevation and with springs guard structure added.
Figure 45:
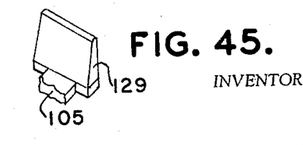
FIG. 45 is similar to FIG. 44 except after placement of said back rest into position of use.

By lifting said blocks and housing away, and feeding pegs 127 and 128 of portable back rest 129 into sockets 130 and 131 respectively, the board is readily converted into a spring chair. In such case the user faces directly away from port P, with his legs or knees flanked by shank portions 103 and 104.

Insofar as applicant is aware, a spring chair swingably and bifurcatedly pivoted on elevated fulcrums in the manner described, and having resilience supplied by leaf springs making slip contact with the under surface of the seat of the chair, is new per se.

Optionally guard structure may be provided in the vicinity of said slip contact, e.g. in the form of inverted-box-like housing 132 (FIGS. 42, 39, 40) integral with the under surface of the board (or seat) 105, but open at the rear as at locus 133 (FIG. 42) so as not to interfere with the springs or their flexing.

In FIGS. 46–49 board 134 is generally similar to board 105 of FIGS. 37–45 except that it comprises pusher structure 135 adapted to compress coil spring 136 during down travel of the board, and apart from conventional coils-alining structure 137 integral with 135, makes no other contact with spring structure.

Coil spring 136 is disposed in recess 138 of base block 139 which in turn is mounted on anchorage 140 carried by craft 141. To place the board in position of use it is only necessary to feed recess 142 in block 139 downwardly over wall 143 of anchorage 140 and add such weighting, if any, as may appear desirable to insure stability of block 139 against forces generated during use of the board.

Figure 47:
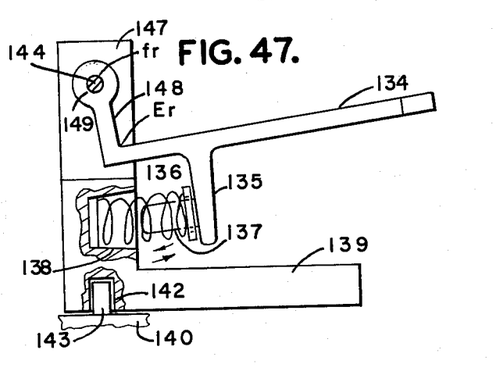
FIG. 47 is a fragmentary side elevation, partly in section, of the assembly of FIG. 46, and shows a form of anchorage therefor.
Figure 48:
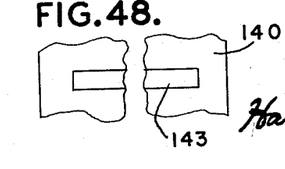
FIG. 48 is a plan view detail of a portion of the anchorage shown in FIG. 47.
Figure 49:
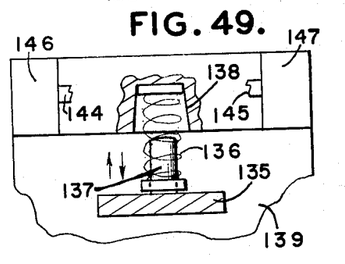
FIG. 49 is a fragmentary plan detail, partly in section, of the structure of FIGS. 46–47.

Pins 144 and 145, projecting from upper side walls 146 and 147 of block 139, penetrate eyes at the upper ends of rigid shank portions of the board which are rigidly upwardly elbowed therefrom as at El. Right-side shank portion 148 having eye 149 rotatably pivoted on pin 144 as in FIG. 47 is illustrative, the left-side counterpart (obscured in the figure) being similarly pivoted on pin 145.

Figure 46:
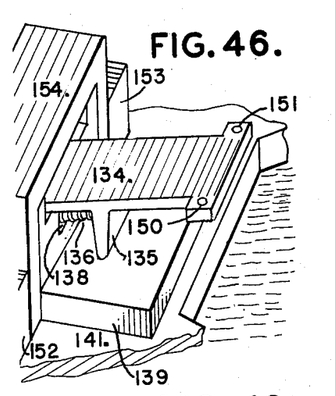
FIG. 46 is similar to FIG. 43 except for substitution of a coil compression spring system for the leaf springs of said figure, and the addition of pusher structure integral with the diving board for compressing said spring during use.

Sockets 150 and 151 exemplify the fact that by lifting away blocks 152, 153 and housing 154 the board becomes available as a sun chair simply via addition of a portable back rest such as 129 of FIGS. 44–45.

No shock absorber is included in FIGS. 46–49 other that the board itself, since the board is not attached to the spring 137 and consequently, if made sufficiently heavy, may impart all the dampening effect desired.

Figure 50:
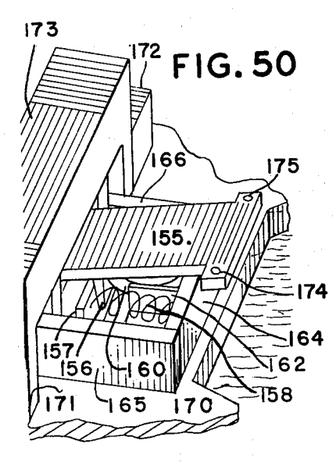
FIG. 50 is a perspective similar to FIG. 46 except for substitution of a system of horizontally disposed distensible coil springs for the compression spring system of said figure, plus addition of guard structure and a horizontally disposed shock absorber.
Figure 51:
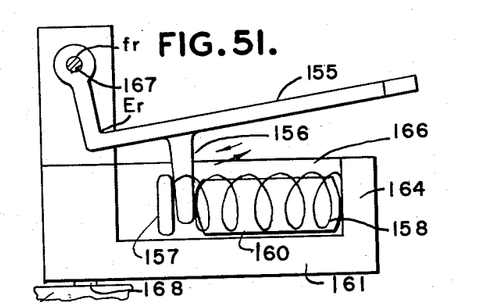
FIG. 51 is similar to FIG. 50 except fragmentary and in side elevation, and with right-side wall, partition and guard structure omitted.
Figure 52:
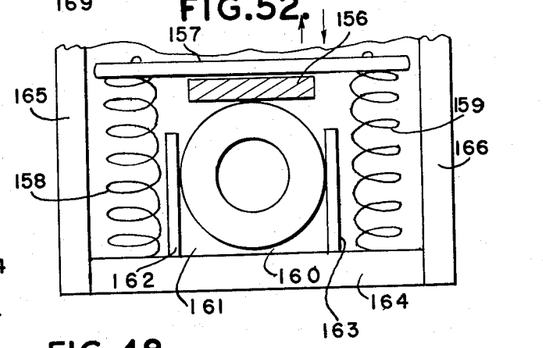
FIG. 52 is similar to FIGS. 50–51 except fragmentary, in plan, and partly in section.
Figure 53:
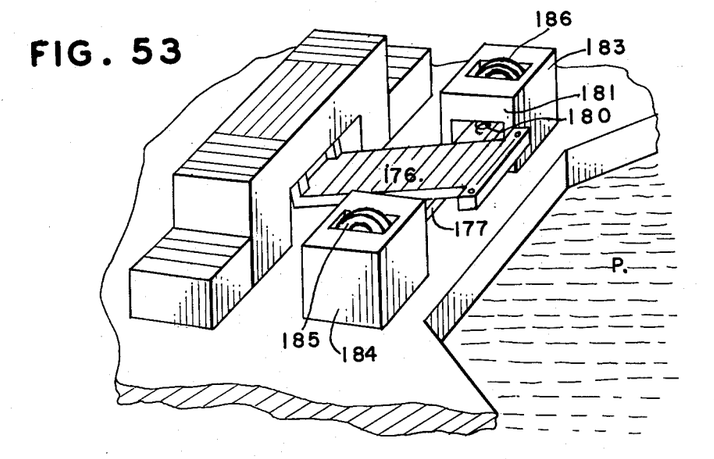
FIG. 53 is a perspective similar to those of FIGS. 43, 46 and 50, except for substitution of a system of downwardly distensible coil springs for the spring systems of said figures, and provision of a pair of uprightly disposed tire-shaped shock absorbers.

In FIGS. 50–52 board 155 is similar to board 134 of FIGS. 46–49 except for comprising puller structure 156 in place of pusher structure 135, which puller structure 156 rests freely (due to gravity alone) against cross bar 157 during non-use of the board and forces the cross bar rearward during down travel of the board. This distends coil springs 158 and 159, affixed to cross bar 157 as shown e.g. in FIG. 52, so that the diver's take-off is aided by retraction of the springs.

Vibration of the springs is dampened by tire-shaped shock absorber 160 lying flat on base block 161 and caged by partitions 162, 163 and front wall 164 of said block 161.

Variable continuing tension can be applied to the springs via selection of tire-shaped shock absorbers having larger diameters than 160.

Right-side guard wall 165 appearing in FIGS. 50 and 52 is omitted from FIG. 51, but its left-side counterpart, guard wall 166, is visible in all three of FIGS. 50–52.

Since the action and adaptabilities of the other parts shown in FIGS. 50–52, including pin 167, wall 168, anchorage 169, craft 170, blocks 171, 172, housing 173, and sockets 174, 175 are manifestly the same as those of their respective counterparts (144, 143, 140, 141, 152, 153, 154, 150 and 151) in FIGS. 46–49, no further reference to them will be here made.

In FIGS. 53–58 there again is extensive manifest similarity of action and adaptabilities, to the embodiments of FIGS. 37–45, 46–49 and 50–52, so that numbering and detailed description of the parts is believed unneeded, except in regard to the structures specially shown in FIGS. 54–58.

Figure 54:
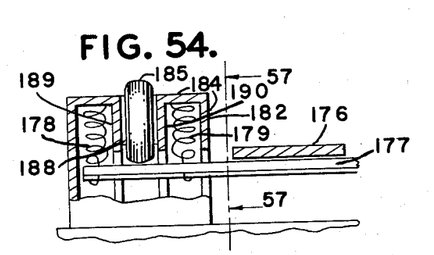
FIG. 54 is a fragmentary front elevation, partly in section, of the right-side housing structure for springs and shock absorber appearing in FIG. 53.
Figure 55:
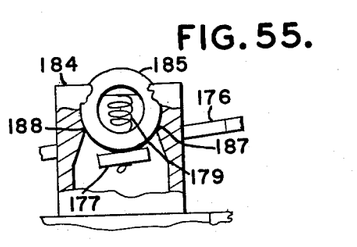
FIG. 55 is similar to FIG. 54 except in right-side elevation.
Figures 56, 57, 58:
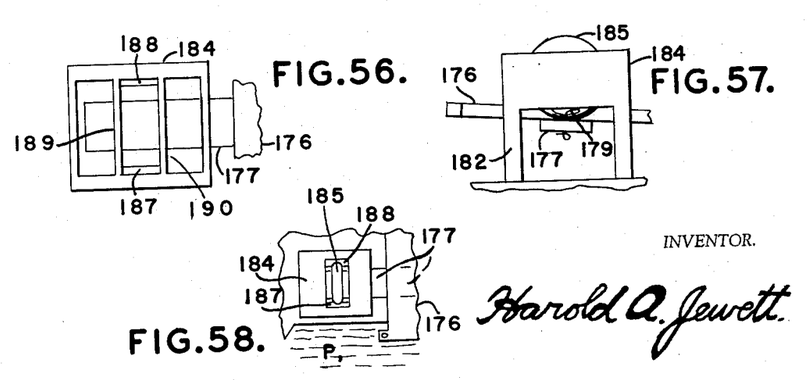
FIG. 56 is a plan view of the structure of FIG. 54, with certain parts removed.
FIG. 57 is a side elevation detail on line 57—57 of FIG. 54, looking in the direction of the arrows.
FIG. 58 is a plan view detail of the structure of FIGS. 54 and 57, but with roof structure added to overlie the springs.

Board 176, resting freely on saddle bar 177, forces the latter downwardly under the weight of a diver, thus distending right-side springs 178 and 179 as well as left-side counterparts thereof, only one (180) of which appears in the figures (cf. FIG. 53), each of said springs being attached to said bar 177 as best seen in FIG. 54.

The lower portions of inner walls 181 and 182 of housings 183 and 184 are windowed, as clearly appears in FIGS. 53–55 and 57, to make room for saddle bar 177.

When the diver takes off and the springs consequently retract, up motion of the bar is stopped by tire-shaped shock absorbers 185, 186 which are freely supported by slightly convergent wall structures such as 187, 188 of rear wall 189 in the case of right-side housing 184 (the left-side housing 183 comprising similar counterparts, not only of said structures 187, 188 but of all other structures appearing in right-side FIGS. 54–58).

Partitions 189 and 190 prevent displacement of the shock absorbers. The latter are not roofed over by the housing, but the springs are, as is clearly apparent in FIGS. 54, 53 and 58.

Variable continuing tension can be applied to the springs by selecting shock absorbers of increased weight and/or increasing the weight of the saddle bar 177 and/or of the board 176.

It will be noted that by reason of the aforesaid convergent wall structures 187, 188 the shock absorbers do not ride down with the board, but are free to be jolted upwardly by the impact of its return motion.

In FIGS. 59–63 board 191 is integral with frame 192 which comprises lateral arms 193 and 194 affixed to distensible coil springs 195 and 196 respectively, and equalizer shank 197; said board and frame constituting a unit which is rigid throughout. When a diver steps on the board and it moves downward in consequence, the motion is rectilinear because movement of equalizer shank 197 is confined within the vertical walls of equalizer box 198.

The slight rear-to-front downward slope of board 191 (FIG. 61) is optional, being based on the fact that at the instant of a diver's take-off from a conventional diving board its T portion momentarily slopes similarly.

Approach to the board is provided by steps 199 and 200, between hand rails 201 and 202. Optionally, provision for divers to jump down onto board 191 from an elevated position can be made by substituting a stairway-handrails ensemble such as 203 (FIGS. 62–63) for said steps 199, 200 and hand rails 201, 202.

Cushions 204 and 205 are schematic for any desired form of shock absorbers. Housings 206 and 207 conceal the springs as well as the cushions, and are integral with equalizer box 198; and their inner walls are cut away as at 208 (FIG. 59) to make room for arms 193 and 194.

Figure 60:
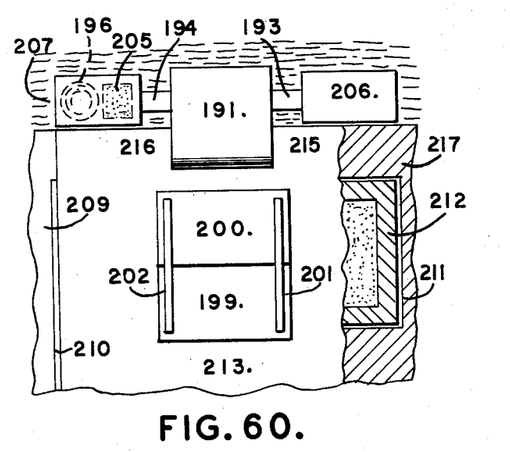
FIG. 60 is a plan view of the assembly of FIG. 59.

Installation of the parts onto a base 209 comprising a basin 210 having an aperture 211 (but no front wall)—whether the base be floatable or not—can be made by first feeding weight box 212 downwardly through said aperture 211, then loading the box with sand or the like, and finally rigidly affixing floor 213 (on which are mounted said parts 199–202) to flange 214 (FIG. 61) of the weight box; housings 206 and 207 being then rigidly integrated with said floor 213 by any suitable means, not shown, as at loci 215 and 216 of FIG. 60, with said flange 214 resting on the bottom 217 of basin 209.

Figure 59:
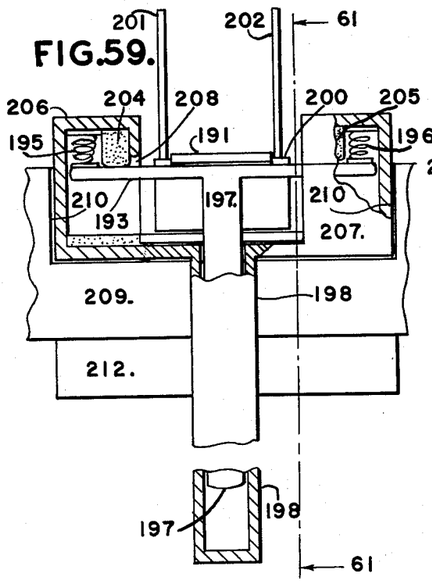
FIG. 59 is a front elevation, partly in section and with certain parts broken away, of a further embodiment of the diving board assembly of the invention.
Figure 61:
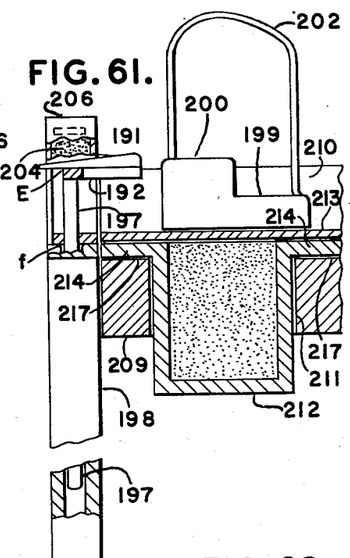
FIG. 61 is a side elevation, partly in section, on line 61—61 of FIG. 59, looking in the direction of the arrows.

Stability of the installation against forces generated by use of the board is thus insured, via the weighting of box 212 together with the snugness of its fit in aperture 211 and the rigidness of its interaffixation with the floor 213 and interconnected parts.

Figure 62:
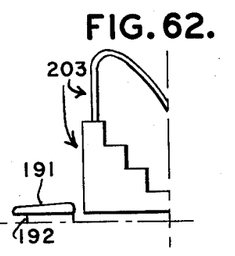
FIG. 62 is a side elevational detail of a stairway serving to provide an elevated approach to the diving board of FIGS. 59–61.
Figure 63:
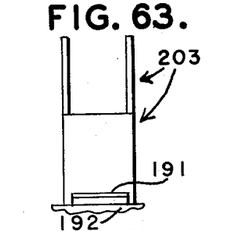
FIG. 63 is similar to FIG. 62 except in plan view.
Figure 64:
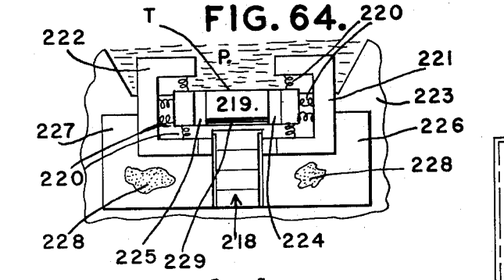
FIG. 64 is a plan view of a novel assembly comprising a non-lever form of diving platform suspended by horizontally disposed coil springs anchored on walls of a box-like structure comprised in a mounting of the invention, said platform being approachable by a stairway such as that of FIGS. 62–63.
Figure 65:
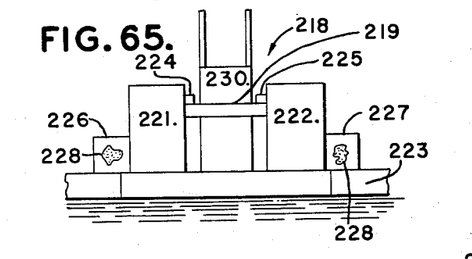
FIG. 65 is similar to FIG. 64 except in front elevation.

In FIGS. 64–65 the assembly bears considerable similarity to that of FIGS. 59–61 when the latter comprises the approach ensemble 203 of FIGS. 62–63. I.e., use of approach ensemble 218, corresponding to said 203, enables the diver to jump down onto diving platform 219 which is resiliently suspended by horizontally disposed coil springs 220 anchored in the walls of box-like structures 221, 222 mounted on base 223, and thence into the water. Of course the jump-down approach is merely optional, and ordinary diving, e.g. with the diver's toes more or less gripping the take-off edge T, can be practiced without it. Barriers 224, 225 serve as both physical and psychological safeguards against the user's inadvertently coming into contact with the springs.

Lateral-rearward extensions 226, 227 of said box-like structures are weighted, as with sand 228, to prevent upward displacement of said structures during use as well as to supplement whatever fastening agencies may be chosen for preventing corresponding horizontal displacement.

Bevelling of the rear portion of platform 219 as at 229 serves to obviate risk of pinching of the user's feet or toes between the platform and the front wall 230 of said approach ensemble 218.

It will be noted that T directly overlies the water in port P; also that nothing but open space and water confront the user, i.e. between T and P.

Figure 66:
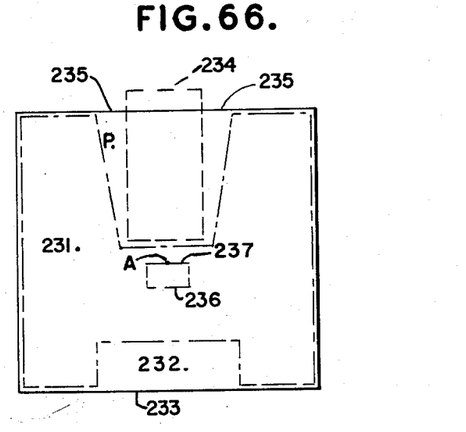
FIG. 66 is a diagrammatic plan view of a craft generally similar to that of FIG. 12 but with superstructure depicted by long and short dash lines, the overall preemptive boundary depicted in solid-line outline, and an imaginary tank depicted by dash lines, said tank to be referred to below in connection with certain preferred aspects of the invention.
Figure 67:
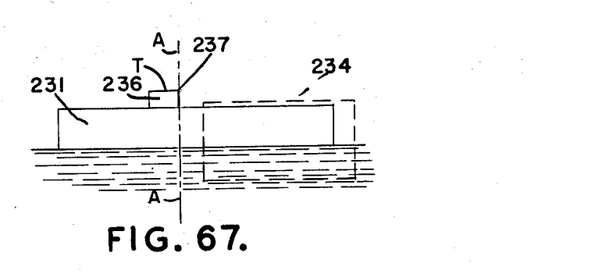
FIG. 67 is similar to FIG. 66 except in side elevation.

In the craft of FIGS. 66–67 no float members are visible. They may be thought of as entirely concealed by superstructure 231 of the craft (unnumbered) which superstructure is cut away at the front to provide port P and at the rear to provide optional harbor 232 (useful e.g. as a site for one or more ladders and/or tow-line-, sail-, outboard motor- or mooring appliances; etc.). The preemptive boundary 233 of the craft dissects imaginary diving tank 234 so that a minor portion of said tank protrudes beyond the portion 235 of said boundary which subtends the mouth of port P. Block 236, mounted on superstructure 231, provides a take-off surface T whose T-edge 237 is about ½ foot to 1 foot higher than said superstructure, is tangent to the A-axis, and is disposed about a foot rearward of P.

Imaginary tank 234 is about 6 feet long, 3 feet wide and 3 feet deep, its top being slightly lower than said T-edge 237 and also being wholly open for purposes of being imaginarily dived into by a diver taking off from T.

In addition, the tank is conceived of as wholly open at the bottom and as containing nothing but air (if the exposed water in P underlies it) or air plus water (if the water level in P is above the bottom of the tank).

The main purpose of FIGS. 66–67 is to portray the facts that the shore of port P desirably is not over a foot frontward of the T-edge 237, that the latter desirably is very close to A (preferredly tangent to it), and that an at least 3 foot-wide free-space-for-diving, extending at least about 6 feet frontwardly of the rear of P and at least 3 feet downwardly from the level of T-edge 237 advantageously will be made exclusively available as a diving space, entirely free from any obstacles other than air and water; said dimensions having been selected to accord with the approximate sizes, proportions and safety needs of typical divers.

It will be noted that said 6 feet of length need not be entirely inside port P, even though preferredly at least 4 feet of it will be.

Figure 68:
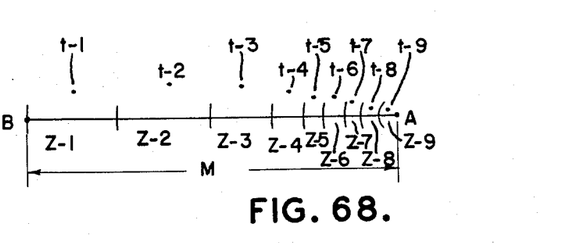
FIG. 68 is an analytical diagram depicting certain progressively more preferred zones to be particularized below, for placement of the take-off edge of diving boards used in the invention, in relation to the A-axis.

In FIG. 68 point A represents the A-axis of a craft and line M the overall (plan view) distance between A and point B, the latter being any point in the craft's area or areas of water displacement, taken at the water level, which is located a maximum distance from A in the plane of the water level, i.e. located most remotely from A at said level. The arcs (unnumbered) intersecting M at spaced intervals are respectively representative of full circles having a common center, A, and define progressively smaller circular (in plan view) zones, respectively designated Z–1 to Z–9, within which placement of the T-edge of a diving platform or board becomes correspondingly more advantageous. Thus, the locating of any part of such T-edge inside any of said zones will be preferable to locating it outside them all, but as the locus of such a part moves inwardly, as say from $t$–1 in Z–1 to $t$–2 in Z–2, $t$–3 in Z–3 and so on to $t$–9 in Z–9 or, in the optimum, into coincidence with A, the placement of said part becomes correspondingly more effective in minimizing tipping.

As shown in the drawing, the lengths of the radii of said arcs are as follows:

| Zone | Radius |
|---|---|
| Z–1 | M |
| Z–2 | $\frac{3M}{4}$ |
| Z–3 | $\frac{M}{2}$ |
| Z–4 | $\frac{M}{3}$ |
| Z–5 | $\frac{M}{4}$ |
| Z–6 | $\frac{M}{5}$ |
| Z–7 | $\frac{M}{7.5}$ |
| Z–8 | $\frac{M}{10}$ |
| Z–9 | $\frac{M}{20}$ |

As a rule, the smaller the particular craft the more critical said placement of the T-edge becomes, so that if the total displacement area at the water level is under, say, 10 square feet, it is of special importance to have a $t$-point at least inside Z–8 or, much better Z–9, if not substantially in coincidence with A. And as the elevation of the T-edge above the water level increases, say from ½ to 1, 1½, 2, 3 or even more feet, said importance increases accordingly. Also, where the T-edge is that of a springboard, it increases still further because of the aggravated down force of a diver's take-off in cases where he may have made one or more preliminary jumps on the T-surface in advance of his take-off.

With craft whose total area of water displacement, taken at the water level, is within the range of 10 to 35 square feet, placement of a $t$-point within Z–5, better Z–6 or still better Z–7, will usually be particularly desirable, or if the range be 35 to 100 square feet, Z–4 or even Z–3; whereas if the range be 100 to 350 square feet, Z–2 may suffice, or if within 350 to 640 square feet, Z–1.

Figure 69:
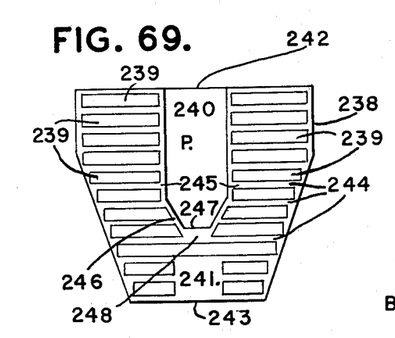
FIG. 69 is a diagrammatic plan view of a raft of the invention, to be spoken of below in specifically defining the overall preemptive area and overall preemptive boundary of the crafts of the invention, as well as the diving are of the ports of the invention.

In FIG. 69 the preemptive (i.e. overall preemptive) boundary 238 of the raft (unnumbered) appears as a closed solid line encompassing planks such as 239 which are interconnected by any suitable means (not shown) to constitute the superstructure or deck of the raft, which superstructure or deck is supported by any suitable buoyancy structure or structures (not shown), the same being located entirely inside said boundary 238 but entirely outside boundary 240 of the diving area of port P.

In accordance with the definitions already set forth of the preemptive area and boundary (i.e. overall preemptive area and boundary or periphery) of any craft, said boundary 238 represents, in plan view, the shortest vertical flexible film which can imaginarily be wrapped around the craft (except that any structure above the level of the T-edge of a particular diving platform or board mounted on the craft is excluded, for purposes of applying the test, as well as for applying analogous other tests of the invention). By definition therefore, not only large re-entrant areas such as P and harbor 241 (analogous to 232 of FIG. 66) are subtended as by portions 242 and 243 of boundary 238, but also small re-entrant areas or inlets such as between planks 239, and at illustrative loci 244.

In keeping with the general definition already set forth of the diving area of the ports of the invention, boundary 240 of the diving area of port P in FIG. 69 represents, in plan view, the longest vertical flexible film reaching at least 3 feet downward—also at least to the water level—which can be imaginarily expanded (without overlap) within P without intersecting craft structure; portion 242 of the craft's preemptive boundary 238 being taken as part of the diving area boundary 240 however, because it imaginarily closes or subtends the port, by bridging or subtending it across the widest portion of its mouth. To rule out imaginary bulging of the film into small between-planks inlets such as at illustrative loci 245 however, and yet provide for a measure of such imaginary bulging into large bays such as 246, it is intended that as soon as convergence of portions of said boundary 240 into such a bay reaches a point where said portions can be joined by a straight line (i.e. a subtense of the bay at that point) 1½ feet long, such line shall be taken as part of said boundary 240. In the drawing such a part is exemplified by subtense 247 of portion 248 of bay 246.

Subject to the foregoing particularizations, it may be helpful to think of the craft and the port, for purposes of visualizing the craft's preemptive area and the port's diving area, as respectively "cellophane-wrapped" and "cellophane-lined."

To provide for preferred degrees of proximity of the diving areas of subject ports to the A-axes of their crafts, it is advantageous to have the front-rear dimension of said areas at least ⅓, better ⅖ and still better ½ that of the front to rear dimension of the preemptive area of the craft.

On the other hand, to provide for ample deck space for spectators, it is advantageous to have the ratio of said preemptive area to said diving area at least ⅖, better ⅗, still better ⅔, or even ¾ or more; such ratios being especially applicable where said diving area is 3 feet or more in width and 4 feet or more in front-rear dimension.

All references to contour, size, dimensional relationships, proportioning, etc., of the novel boards of the invention are intended to apply to the up (i.e. at-rest) position of the board, prior to a diver's presence on it. This to some extent contrasts with corresponding references to the crafts of the invention, because the latter references have general application irrespective of whether or how much the crafts are loaded, so long as they are actually or hypothetically afloat, static, motionless, and in substantial equilibrium.

The novel diving boards of the invention and the various mountings for them exemplified in the drawings can of course be installed on non-floating bases as well as floating ones. If a particular non-floating base be of questionable strength however, as may happen e.g. in the case of docks for small boats, mooring of one of the crafts at, rather than on such a base will enable the major stresses generated in diving to be absorbed solely by the craft and the water underlying it, rather than by the planking or other floor structure of the base, and at the same time will enable the piles, posts or other stationary land-based fixtures supporting such floor structure to be availed of as anti-skid agencies after the manner of posts 6 and 7 in FIGS. 1-4.

Whether or not the craft be so moored however, it is desirable that its float structure or members comprise one or more rearwardly facing flat vertical peripheral surfaces, parallel to the T-edge of the diving board or platform, so as to interpose a keel effect against rearward skidding consequent on a diver's take-off.

Novel subject matter disclosed but not claimed herein is being claimed in related applications S.N. 192,237 filed May 3, 1962 and S.N. 238,339 filed Nov. 19, 1962.

It will be apparent that many changes in the physical embodiments of the invention and its novel aspects may be made within the scope of the appended claims without departing from the spirit of the invention.

I claim:

1. A diving assembly comprising a watercraft having a floor for spectators, a springboard, and normally submerged buoyant portions at least partially underlying said floor, the total area of water-surface displaced by said watercraft, measured in the plane which includes the water level, being within the range of 10 to 640 square feet; which watercraft further comprises, in combination:
    (a) right-side and left-side frontward structures mutually spaced to provide
    (b) a diving port which is re-entrantly located in respect to the preemptive boundary of said watercraft, at least a portion of which port is at least 3 feet wide and at least one point in the water surface of which port is re-entrantly distant at least 4 feet from said boundary,
    (c) framework inter-uniting said right-side and left-side frontward structures,
    (d) a springboard having an upper front edge at least 1 foot above said plane, which edge is located frontwardly of an imaginary vertical plane that is parallel to said edge and is located one foot rearward of said port;
    (e) said springboard being affixed to and supported by said framework, and having a take-off surface which extends at least one foot rearwardly from said edge,
    (f) at least one point in said edge being within the distance $M/X$ from the axis of uniform sinkability of said watercraft,
    (g) M being the maximum distance, measured in said plane, from said axis to any point in the area of water-surface displaced by said watercraft, and
    (h) X being at least 4.

2. The assembly of claim 1 wherein said total area is within the range of 10 to 350 square feet.

3. The assembly of claim 2 wherein said total area is within the range of 10 to 100 square feet.

4. The assembly of claim 3 wherein said total area is within the range of 35 to 100 square feet and X is at least 5.

5. The assembly of claim 2 wherein said total area is within the range of 10 to 100 square feet and
    (j) said springboard slopes upwardly toward said upper front edge,
    (k) said edge is at least 1½ feet above the plane which includes the water level, and
    (l) said edge also overlies water in said diving port.

6. The assembly of claim 2 wherein said buoyant portions include
    (m) a plurality of float members, at least one of them being disposed farther frontwardly than, and in spaced relation to, another of them, and wherein
    (n) said total area includes the sum of the areas of water-surface displaced by said plurality, each said area being measured in the plane which includes the water level.

7. The assembly of claim 6 wherein said total area is within the range of 35 to 100 square feet and
    (o) at least one of said float members has a wall surface which is flat and disposed to resist skidding of said assembly during use.

8. A watercraft
    (a) having a deck providing a floor for users of the watercraft and also having buoyant portions at least partially underlying said floor,
    (b) said watercraft further comprising a diving port re-entrantly located in respect to the preemptive boundary of said watercraft,
    (c) said watercraft also comprising a springboard having a take-off surface for diving,
    (d) which surface has a take-off edge at its front,
    (e) said springboard being in operative proximity to water in said diving port,
    (f) the total area of water-surface displaced by said watercraft, measured in the plane which includes the water level, being within the range of 10 to 640 square feet,
    (g) at least one point in said take-off edge being within the distance $M/X$ from the axis of uniform sinkability of said watercraft,
    (h) M being the maximum distance, measured in said plane, from said axis to any point in the area of water-surface displaced by said watercraft, and
    (i) X being at least ⅘.

9. In combination with the watercraft of claim 8,
    (a) land-based means disposed to block said watercraft against rearward movement due to the force of a diver's take-off.

10. The watercraft of claim 8 wherein
    (j) said springboard is a lever-type diving board,
    (k) said total area is within the range of 35 to 350 square feet, and
    (l) X is at least 2.

11. The watercraft of claim 10 wherein said total area is within the range of 35 to 100 square feet and X is at least 3.

12. The watercraft of claim 11 wherein X is at least 5.

13. The watercraft of claim 10 wherein
    (m) said take-off edge is at least 2 feet above the water level,
    (n) said range is 35 to 100 square feet, and
    (o) X is at least 4.

14. The watercraft of claim 13 wherein X is at least 7.5.

15. A diving assembly comprising a raft having a deck providing a floor for users of the assembly; said raft also having normally submerged buoyant portions at least partially underlying said floor, the total area of water-surface displaced by said raft, measured in the plane which includes the water level, being within the range of 10 to 100 square feet, wherein said raft is provided with
    (a) a re-entrantly located diving port a portion of which is at least 3 feet wide, and the overall front-to-rear dimension of the diving area of which port is at least ⅔ the front-to-rear dimension of the preemptive area of said watercraft as measured in the straight line which includes said first-mentioned dimension,
(b) a springboard whose upper front edge is in operative proximity to and at least one foot above water in said diving port; said raft being in operative juxtaposition to
(c) at least one land-based post disposed to block skidding movement of the raft during use.

16. The assembly of claim 15 wherein said raft includes a right-side aperture and a left-side aperture into each of which apertures a land-based post extends, whereby to block skidding movement of said raft during use.

17. The assembly of claim 15 wherein said total area is within the range of 35 to 100 square feet.

18. A diving assembly
(a) comprising a watercraft having a deck providing a floor for users of said assembly; said watercraft also having normally submerged buoyant portions at least partially underlying said floor,
(b) said watercraft having a diving port re-entrantly located in respect to the preemptive boundary of said watercraft,
(c) the over-all front-to-rear dimension of the diving area of said diving port being at least ⅔ the front-to-rear dimension of the preemptive area of said watercraft as measured in the straight line which includes said first-mentioned dimension,
(d) the width of at least a portion of said diving area being at least 3 feet,
(e) said watercraft comprising a diving platform which is at least a foot in front-to-rear dimension and has an upper front edge,
(f) said upper front edge including at least one point which is at least as close as one foot, in overall horizontal distance, to water in said diving area,
(g) said at least one point being within the distance $M/X$ from the axis of uniform sinkability of said watercraft,
(h) M being the maximum distance measured in the plane which includes the water level, from said axis to any point in the area of water-surface displaced by said watercraft, said area being measured in said plane,
(i) X being at least 10,
(j) said at least one point being at least 1 foot above the surface of water in said driving area, and
(k) the total area of water-surface displaced by said watercraft, measured in said plane, being within the range of 10 to 350 square feet.

19. The assembly of claim 18 wherein said total area is within the range of 10 to 100 square feet and
(l) said axis of uniform sinkability intersects water in said diving area.

20. The assembly of claim 19 wherein
(m) the ratio of said preemptive area to said diving area is at least ⅘, and
(n) the front-to-rear dimension of said diving area is at least 4 feet.

21. The assembly of claim 19 wherein said total area is within the range of 35 to 100 square feet and
(o) said at least one point directly overlies water in said diving area,
(p) X being at least 20.

22. The assembly of claim 19 wherein said upper front edge is elevated at least two feet above the water level.

References Cited by the Examiner
UNITED STATES PATENTS

| | | | |
|---|---|---|---|
| 1,579,510 | 4/26 | Brown | 272—66 |
| 1,635,204 | 7/27 | Brown | 272—66 |
| 1,700,153 | 1/29 | Bradley | 114—0.5 |
| 2,024,028 | 12/35 | Dahlberg et al. | 272—66 |
| 2,027,474 | 1/36 | Dean | 272—66 |
| 2,217,879 | 10/40 | Willey | 61—46.5 X |
| 2,334,992 | 11/43 | Crake | 61—46.5 |
| 2,635,675 | 4/53 | Buck | 155—51 |
| 2,645,483 | 7/53 | Smith | 272—66 |
| 2,664,146 | 12/53 | Jackson | 155—51 |
| 2,675,235 | 4/54 | Nightingale | 272—66 |
| 2,742,012 | 4/56 | Bridges | 9—11 |
| 2,814,057 | 11/57 | Burns | 9—8 |
| 2,857,872 | 10/58 | Usab | 9—8 |

FOREIGN PATENTS

| | | |
|---|---|---|
| 1,033,472 | 4/53 | France. |
| 343,214 | 11/21 | Germany. |
| 104,721 | 6/42 | Sweden. |

OTHER REFERENCES

Theoretical Naval Architecture by E. L. Attwood and H. S. Pengelly, published March 1943 by Longmans, Green and Co., London, New York and Toronto; printed in Great Britain by Wm. Clowes & Sons, Ltd, Beccles. Chapters II and III cited.

RICHARD C. PINKHAM, *Primary Examiner.*

ELLIS E. FULLER, DELBERT B. LOWE, *Examiners.*